United States Patent [19]
Davis et al.

[11] Patent Number: 4,640,973
[45] Date of Patent: Feb. 3, 1987

[54] POLYAMIDE RESIN CAPABLE OF FORMING CONTAINERS HAVING IMPROVED GAS BARRIER PROPERTIES FROM PHENYLENE DIOXY DIACETIC ACID AND NAPHTHALENE DICARBOXYLIC ACID

[75] Inventors: Burns Davis; Robert B. Barbee, both of Kingsport, Tenn.

[73] Assignee: Eastman Kodak Company, Rochester, N.Y.

[21] Appl. No.: 785,132

[22] Filed: Oct. 7, 1985

[51] Int. Cl.$^4$ .............................................. C08G 69/26
[52] U.S. Cl. ................................... 528/208; 528/335; 528/339; 528/347; 528/348; 428/475.5
[58] Field of Search ............... 528/208, 335, 339, 347, 528/348; 428/475.5

[56] References Cited
U.S. PATENT DOCUMENTS 4,482,695  11/1984  Barbee et al. ...................... 528/208

*Primary Examiner*—Harold D. Anderson
*Attorney, Agent, or Firm*—Clyde L. Tootle; J. Frederick Thomsen; William P. Heath, Jr.

[57] ABSTRACT

The present invention provides polyamide resins useful for forming containers having improved resistance to gas permeability. The containers are formed from a polyamide resin which comprises the reaction product of a diamine containing 2 to about 10 carbon atoms and a diacid component which comprises about 25 to 95 mole percent of a first diacid selected from 1,4-phenylenedioxy diacetic acid, 1,3-phenylenedioxy diacetic acid, 1,2-phenylenedioxy diacetic acid, and mixtures thereof, and about 5 to about 75 mole percent of a naphthalene dicarboxylic acid. The polyamide resin has an inherent viscosity of about 0.5 to 1.5. The containers which are provided by the present invention may be in the form of sheet, film, molded articles, such as bottles, and other such structures.

18 Claims, No Drawings

POLYAMIDE RESIN CAPABLE OF FORMING CONTAINERS HAVING IMPROVED GAS BARRIER PROPERTIES FROM PHENYLENE DIOXY DIACETIC ACID AND NAPHTHALENE DICARBOXYLIC ACID

DESCRIPTION

The present invention relates to polyamide resins useful for forming packages for protecting comestibles. More specifically, it relates to polyamide resins for forming films and molded containers which have improved gas barrier properties.

Presently there is a strong interest in the packaging industry for protecting comestibles (such as foodstuffs, medicines, and especially carbonated beverages) by enveloping the substances in packages which are formed from various polymers which have good barrier properties. One group of polymers in which there is an especially strong interest is homopolyamides and copolyamides. Containers formed from these materials exhibit relatively good gas barrier properties. Typical prior art polyamides are disclosed, for example, in U.S. Pat. No. 4,261,473. Examples of such polyamides include polycaprolactam (Nylon 6), poly-ω-aminoheptanoic acid (Nylon 7), poly-ω-aminononanoic acid (Nylon 9), polyundecanamide (Nylon 11), polylauryllactam (Nylon 12), polyethylene adipamide (Nylon 2-6), polytetramethylene adipamide (Nylon 4-6), polyhexamethylene adipamide (Nylon 6-6), polyhexamethylene sebacamide (Nylon 6-10), polyhexamethylene dodecamide (Nylon 6-12), polyoctamethylene adipamide (Nylon 8-6), polydecamethylene adipamide (Nylon 10-6) and polydodecamethylene sebacamide (Nylon 12-8).

It would therefore be an advance in the state of the art to provide polyamide compositions which can be formed, for example by blow molding operations, into containers which have improved structural strength properties and improved gas barrier properties useful in the packaging industry.

In accordance with the present invention, it has been found that a particular polyamide resin comprises the reaction product of a diamine containing 2 to about 10 carbon atoms with a diacid component comprising about 25 to 95 mole percent of a first diacid selected from 1,4-phenylenedioxy diacetic acid, 1,3-phenylenedioxy diacetic acid, 1,2-phenylenedioxy diacetic acid, and mixtures thereof, and about 5 to about 75 mole percent of a naphthalene dicarboxylic acid. The polyamide exhibits an inherent viscosity of about 0.5 to 1.5.

These polyamide resins can be formed into containers having improved resistance to gas permeability. As used herein, the term "container" is intended to mean shaped articles formed from the specified polyamides which are suitable for use in packaging comestibles. Such shaped articles include not only sheets and films which are extruded from the polyamide and which may be used as such or as barrier layers, container liners, as components of laminates or other composites, and the like, but also articles which include blow molded containers, such as bottles.

The polyamides of the present invention comprise the reaction product of a diamine component and a diacid component. The diamine component comprises one or more diamines containing 2 to about 10 carbon atoms. The diamine can be aliphatic diamines or diamines which contain aromatic groups, as long as an alkylene group (e.g., a methylene group) is interposed between an amino group and an aromatic ring. The aliphatic diamines also include cycloaliphatic diamines, such as piperazine. Thus, examples of suitable diamines include 1,5-pentanediamine, 1,6-hexanediamine, 1,7-heptanediamine, 1,8-octanediamine, 1,9-nonanediamine, piperazine, 1,3-cyclohexanebismethylamine, 1,4-cyclohexanebismethylamine, p-xylylenediamine, m-xylylenediamine, as well as mixtures thereof, and the like. The aliphatic diamine preferably comprises 1,6-hexanediamine, piperazine, p-xylylenediamaine, m-xylylenediamine, or a mixture thereof.

The polyamide resin further comprises diacid components. The diacid component comprises a first diacid selected from 1,4-phenylenedioxy diacetic acid, 1,3-phenylenedioxy diacetic acid, 1,2-phenylenedioxy diacetic acid, and mixtures thereof. The diacid component also includes a naphthalene dicarboxylic acid. The naphthalene dicarboxylic acid can be a naphthalene dicarboxylic acid such as, for example, preferably the 2,6-naphthalene dicarboxylic acid, 2,7-naphthalene dicarboxylic acid, and the like. Other well-known polyamide-forming diacids may be employed in minor amounts. Such diacid components may include, for example, isophthalic acid, 1,4-cyclohexanedicarboxylic acid, linear lower alkyl dicarboxylic acids, and the like. The diacid component can also be the acid halides and esters, particularly the lower alkyl ($C_1$–$C_4$) esters of the first and other diacid components and polyamide forming acids mentioned.

The first diacid, which is selected from 1,4-phenylenedioxy diacetic acid, 1,3-phenylenedioxy diacetic acid, 1,2-phenylenedioxy diacetic acid, and mixtures thereof, is present in the polyamide in a concentration of about 25 to 95 mole percent, preferably 40 to 90 mole percent, based upon the total amount of diacids present in the polyamide. The diacid component further comprises 5 to about 75 mole percent, preferably 60 to 10 mole percent, of a naphthalene dicarboxylic acid.

When the polyamide is to be formed into a laminated or layered structure or film, the first diacid is preferably present in an amount of at least about 30 mole percent and, more preferably, in an amount of at least about 35 mole percent, preferably about 40 to about 90 mole percent. When a single layered molded container or structure, such as a bottle, is desired, the first diacid is preferably present in an amount of about 25 mole percent and, more preferably, is present in an amount of about 25 to 50 mole percent.

The polyamide which is employed in the present invention exhibits an inherent viscosity of about 0.5 to 1.5. The inherent viscosity is measured at 25° C. in a 60/40 by weight mixture of phenol/tetrachloroethane at a concentration of 0.5 g/100 ml. Polymers having an inherent viscosity within this range are of sufficiently high molecular weight to be used in the formation of the containers of the present invention.

The polyamides of the present invention are synthesized by methods generally known in the art for producing polyamides. The diamine and diacid components are preferably reacted in approximately stoichiometric quantities. Diacid chlorides, esters, and the like can be used. A solvent may be used in the preparation of the polyamide and may be preferred when preparing high melting polyamides which can decompose at temperatures below their melting point.

In general, the reaction involves heating stoichiometric quantities of the diamine and diacid components in the presence of a small amount of water and in an inert atmosphere, such as nitrogen, with stirring. A slight excess of the diamine may be desirable. Water is allowed to distill as the temperature is raised so as to facilitate reaction between the diamine and the dicarboxylic acid and to keep the product fluid. Temperatures in the range of about 180° to 330° C. may be employed, with the preferred range being about 200° to 310° C. Preferably, the final stages of the reaction are conducted under a vacuum and may be carried out under melt phase or solid phase conditions. The polymerization reaction is typically conducted for a period of time of about 2 to 30 hours. The preparation of the polyamide does not require the use of a catalyst, and catalysts typically are not employed during the reaction period. However, suitable catalysts which have been disclosed in the literature can be employed if desired.

It is often desirable to employ a procedure which involves the preparation of a salt from the diacid and the diamine. By means of such a procedure, better control of the stoichiometry can be obtained. Such salts are well known in the art and can be prepared by heating the diamine and diacid to reflux temperature in the presence of a solvent. The salts which are formed represent an ionic combination of the diamine and the diacid. The salts can be isolated in solid form and have well-defined melting points, values for which have been generally reported in the literature. The salts which are obtained can be heated with stirring so as to melt the salt, thereby forming a polymeric product accompanied by the formation and release of water. Preferably, as the salt is heated to its melting point, a small amount of water such as about 10% by weight, based upon the weight of the salt is added to the reaction system to aid in the removal of oxygen from the system. The preparation of the polyamide proceeds as described above.

Of course, suitable additives, such as dyes, pigments, plasticizers, fillers, antioxidants, stabilizers, etc., may be employed in conventional amounts. Such additives may be added directly to the reaction or may be added to the final polymer.

The polyamides described above may be formed into the containers by conventional plastic processing techniques. For example, sheets, films, and other like structures can be formed by well-known casting and extrusion techniques.

Film or sheet material made from the compositions of the present invention is strong, flexible, and clear. It may be formed into articles such as wrappers, bags, and the like.

The polyamides may also be used by coextrusion or lamination of a layer between two or more permeable layers of film. In like manner, a layer of the polyamides of the present invention (preferably, a composition containing about 50% of the first diacid), may be coextruded as a pipe or similar structure between two or more permeable layers. The polyamides may also be used for dip coating containers from a polymer solution in order to improve the barrier properties of a package. Coated articles can also be made by coating a solution of the polyamides on films, bottles and other shaped articles. Coating techniques known in the art can be used, for example, to deposit such coating solutions.

Molded containers can be made from the above-described polyamide by compression molding, blow molding, and other such molding techniques, all of which are well known in the art. Preferred molded containers are biaxially oriented blow-molded containers.

The above-described containers of the present invention are ideally suited for protecting comestibles, such as foodstuffs (especially carbonated soft drinks), medicines, and like substances. The advantages of these containers are due to low oxygen and carbon dioxide permeability and good strength properties. Because of the decreased gas transmission rates of these polyamides, they perform well in packaging applications where improved gas barrier properties are required. Typically, the containers of the present invention exhibit an oxygen permeability of less than about 8.5 (preferably, less than about 7.5) and a carbon dioxide permeability of less than about 50 (preferably, less than about 40), measured as cubic centimeters permeating a 1 mil thick sample, 100 inches square, for a 24 hour period under a partial pressure difference of 1 atmosphere at 30° C.

This invention will be further illustrated by the following examples, although it will be understood that these examples are included merely for purposes of illustration and are not intended to limit the scope of the invention.

EXAMPLE 1

These examples and the following examples illustrate the improved gas barrier properties of containers formed from polyamides containing a naphthalene dicarboxylic acid. Example 1 shows such a polyamide which has been modified with 50 mole percent of 2,6-naphthalene dicarboxylic acid.

A reaction vessel is charged with 50 mole percent 2,6-naphthalene dicarboxylic acid, 102 mole percent 1,7-heptanediamine, 50 mole percent of 1,3-phenylenedioxy diacetic acid, based upon the total diacid present, and 22 percent of distilled water based on the weight of water and reactants. Two percent excess diamine is used based on the theoritical or stoichiometric amount. The reaction mixture is heated and stirred under nitrogen at 200° C. for 30 minutes. The temperature is then increased to 270° C. for 100 minutes. The nitrogen is then turned off from the reaction system, and a vacuum is applied. The reaction condensation is continued at 270° C. for 60 minutes under about 0.5 mm Hg pressure. The heating is discontinued, the reaction mixture is brought to atmospheric pressure with nitrogen, and the polymer is collected.

The oxygen permeability of the polyamide is determined in cubic centimeters permeating a 1 mil thick sample, 100 inches square, for a 24-hour period under an oxygen partial pressure difference of one atmosphere at 30° C. using a MOCON Oxtran 100 instrument. The polyamide is extruded into film using a Brabender extruder at 270° C. The film used to measure permeability is 3–4 mils in thickness, but the permeability was converted to a one mil basis using conventional calculations. In like manner, the carbon dioxide permeability of the polyamide is determined using a MOCON Permatran C instrument.

The results are given in Table I.

EXAMPLE 2

Example 1 is repeated except that 1,3-phenylenedioxy diacetic acid is replaced with 1,4-phenylenedioxy diacetic acid. The oxygen permeability and carbon dioxide permeability of the polyamide are determined as in Example 1, and the results given in Table I.

EXAMPLE 3

Example 1 is repeated except that 1,9-nonanediamine is used in place of 1,7-heptanediamine. The oxygen permeability and carbon dioxide permeability of the polyamide is determined as in Example 1, and the results given in Table I.

EXAMPLE 4

Example 3 is repeated except that 1,3-phenylenedioxy diacetic acid is replaced with 1,2-phenylenedioxy diacetic acid. The oxygen permeability and carbon dioxide permeability of the polyamide is determined as in Example 1, and the results given in Table I.

EXAMPLE 5

This Example illustrates the improved gas barrier properties of containers formed from polyamides containing 25 mole percent naphthalene dicarboxylic acid.

A reaction vessel is charged with 25 mole percent 2,6-naphthalene dicarboxylic acid, 102 mole percent 1,6-hexanediamine, 75 mole percent of 1,3-phenylenedioxy diacetic acid, based upon the total diacid present, and 37.8 percent of distilled water based on the weight of water and reactants. Two percent excess diamine is used based on the theoritical or stoichiometric amount. The reaction mixture is heated and stirred under nitrogen at 200° C. for 15 minutes. The temperature is then increased to 260° C. for 90 minutes. The nitrogen is turned off from the reaction system, and a vacuum is applied. The reaction condensation is continued at 260° C. for 120 minutes under about 0.5 mm Hg pressure. The heating is discontinued, the reaction mixture is brought to atmospheric pressure with nitrogen, and the polymer is collected. The oxygen permeability and carbon dioxide permeability of the polyamide are determined as in Example 1, and the results given in Table 1.

EXAMPLE 6

Example 5 is repeated except that 1,3-phenylenedioxy diacetic acid is replaced with 1,4-phenylenedioxy diacetic acid. The oxygen permeability and carbon dioxide permeability of the polyamide is determined as in Example 1, and the results given in Table I.

EXAMPLE 7

Example 5 is repeated except that 1,6-hexanediamine is replaced with m-xylylenediamine and 10 mole percent of 2,6-naphthalene dicarboxylic acid based on the total acid used. The oxygen permeability of the polyamide is determined as in Example 1, and the results given in Table I.

EXAMPLE 8

Example 7 is repeated except that m-xylylenediamine is replaced with p-xylylenediamine. The oxygen permeability of the polyamide is determined as in Example 1 and the results given in Table I.

TABLE I

| Run | Oxygen Permeability | $CO_2$ Permeability |
| --- | --- | --- |
| Ex. 1 | 1.7 | 12.8 |
| Ex. 2 | 4.4 | 22.0 |
| Ex. 3 | 5.0 | 26.0 |
| Ex. 4 | 5.2 | 24.0 |
| Ex. 5 | 0.8 | 6.1 |
| Ex. 6 | 1.6 | 12.0 |
| Ex. 7 | 0.2 | 1.2 |
| Ex. 8 | 0.3 | 1.8 |

An analysis of the data of Table I indicates the excellent properties exhibited by the polyamides of the present invention which make them extremely advantageous for use in the formation of containers. It will be noted that the compositions described in the examples, without exception, exhibit good oxygen and carbon dioxide permeabilities. The data of Table I further indicate that all the compositions are useful for the formation of improved containers.

While the invention has been described in detail with particular reference to preferred embodiments thereof, it will be understood that variations and modifications can be effected within the spirit and scope of the invention.

We claim:

1. A polyamide composition capable of being formed into molded containers having good gas barrier properties comprising the reaction product of
   (A) a diamine containing 2 to about 10 carbon atoms, and
   (B) a diacid component comprising
      (i) about 25 to 95 mole percent of at least one first diacid selected from the group consisting of 1,4-phenylenedioxy diacetic acid, 1,3-phenylenedioxy diacetic acid and 1,2-phenylenedioxy diacetic acid, and
      (ii) 5 to about 75 mole percent of a naphthalene dicarboxylic acid,
   wherein said polyamide has an inherent viscosity of about 0.5 to 1.5, measured at 25° C. in a 60/40 by weight mixture of phenol/tetrachloroethane at a concentration of 0.5 g/100 ml.

2. The polyamide of claim 1 wherein said naphthalene dicarboxylic acid is 2,6-naphthalene dicarboxylic acid.

3. The polyamide of claim 2 wherein said diamine comprises 1,5-pentanediamine, 1,6-hexanediamine, 1,7-heptanediamine, 1,8-octanediamine, 1,3-cyclohexanebismethylamine, 1,4-cyclohexanebismethylamine, 1,9-nonanediamine, p-xylylenediamine, m-xylylenediamine, or a mixture thereof.

4. The polyamide of claim 3 wherein said diamine is m-xylylenediamine.

5. The polyamide of claim 4 wherein said first diacid is 1,4-phenylenedioxy diacetic acid.

6. The polyamide of claim 4 wherein said first diacid is 1,3-phenylenedioxy diacetic acid.

7. The polyamide of claim 4 wherein said first diacid is 1,2-phenylenedioxy diacetic acid.

8. The polyamide of claim 2 wherein said first diacid is present in a concentration of about 40 to 90 mole percent.

9. The polyamide of claim 8 wherein said first diacid is 1,4-phenylenedioxy diacetic acid.

10. The polyamide of claim 8 wherein said first diacid is 1,3-phenylenedioxy diacetic acid.

11. The polyamide of claim 8 wherein said first diacid is 1,2-phenylenedioxy diacetic acid.

12. A container formed from the polyamide of claim 1.

13. A molded container formed from the polyamide of claim 1.

14. A blow molded container formed from the polyamide of claim 1.

15. A film formed from the polyamide of claim 1.

16. A coextruded article comprising the polyamide of claim 1.

17. A laminated article comprising the polyamide of claim 1.

18. A coated article comprising an article coated with the polyamide of claim 1.

* * * * *